United States Patent
Hu et al.

(10) Patent No.: US 10,838,738 B2
(45) Date of Patent: Nov. 17, 2020

(54) METHOD, DEVICE, AND STORAGE MEDIUM FOR PROCESSING DRIVER ON TERMINAL DEVICE SIDE

(71) Applicant: Zhuhai Pantum Electronics Co., Ltd., Zhuhai (CN)

(72) Inventors: Dongcheng Hu, Zhuhai (CN); Jingling Chen, Zhuhai (CN); Han Yu, Zhuhai (CN); Jibing Peng, Zhuhai (CN); Xiang Chen, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 16/515,268

(22) Filed: Jul. 18, 2019

(65) Prior Publication Data
US 2020/0026526 A1 Jan. 23, 2020

(30) Foreign Application Priority Data

Jul. 18, 2018 (CN) .......................... 2018 1 0790189
Jun. 27, 2019 (CN) .......................... 2019 1 0569641

(51) Int. Cl.
*G06F 9/44* (2018.01)
*G06F 9/4401* (2018.01)
*G06F 8/61* (2018.01)

(52) U.S. Cl.
CPC .............. *G06F 9/4411* (2013.01); *G06F 8/61* (2013.01)

(58) Field of Classification Search
CPC .... G06F 3/1225; G06F 3/1236; G06F 9/4411; G06F 8/61
See application file for complete search history.

(56) References Cited

U.S. PATENT DOCUMENTS

| | | | |
|---|---|---|---|
| 2002/0059310 A1* | 5/2002 | Choi | G06F 11/0748 |
| 2003/0227641 A1* | 12/2003 | Edmonds | G06F 3/1285 |
| | | | 358/1.13 |
| 2005/0066072 A1* | 3/2005 | Nakamura | G06F 3/1204 |
| | | | 710/8 |
| 2005/0188381 A1 | 8/2005 | Mitekura et al. | |
| 2008/0201422 A1* | 8/2008 | Peccora | G06Q 10/00 |
| | | | 709/204 |
| 2010/0165879 A1 | 7/2010 | Gupta et al. | |
| 2012/0154852 A1 | 6/2012 | Hedberg | |
| 2014/0081876 A1* | 3/2014 | Schulz | G06Q 40/08 |
| | | | 705/305 |
| 2015/0140986 A1* | 5/2015 | Lamb | H04L 12/2898 |
| | | | 455/418 |

FOREIGN PATENT DOCUMENTS

EP 3035738 A1 6/2016

OTHER PUBLICATIONS

The European Patent Office (EPO) The Extended European Search Report for 19186662.3 dated Jun. 12, 2019 8 Pages.

* cited by examiner

*Primary Examiner* — Tuan C Dao
(74) *Attorney, Agent, or Firm* — Anova Law Group, PLLC

(57) ABSTRACT

Method, device, and storage medium for processing a driver on a terminal device side are provided. A driver processing method includes displaying a driver installation interface. The driver installation interface provides a connection method prompt message prompting a user to make a connection between a terminal device and a peripheral device.

18 Claims, 5 Drawing Sheets

Displaying a driver installation interface, the driver installation interface providing a connection method prompt message prompting a user to connect the terminal device with a peripheral device ~ 101

FIG. 1

Displaying a driver installation interface, the driver installation interface providing a connection method prompt message prompting a user to connect a terminal device with a peripheral device ~ 201

Receiving a triggering instruction sent by a user ~ 202

Displaying the connection method prompt message indicated by the triggering instruction based on the triggering instruction ~ 203

Detecting connection state information between the terminal device and the peripheral device and determining a specific content of the connection method prompt message based on the connection state information ~ 204

FIG. 2

METHOD, DEVICE, AND STORAGE MEDIUM FOR PROCESSING DRIVER ON TERMINAL DEVICE SIDE

CROSS-REFERENCE TO RELATED APPLICATION

This application claims priority to a Chinese patent application Nos. CN201810790189.7, filed on Jul. 18, 2018, and CN201910569641.1, filed on Jun. 27, 2019, the entire content of all of which is incorporated herein by reference.

TECHNICAL FIELD

The present disclosure relates to the field of electronic device technologies and, more specifically, to a method, device, and storage medium for processing a driver on a terminal device side.

BACKGROUND

A peripheral device needs to be connected to a terminal device, which may be a computer, and the peripheral device may be an image forming device. The peripheral device needs to receive operational data transmitted by the terminal device before starting to complete an operating process, such as performing a printing operation. The opening and editing of documents in the terminal device are usually completed by some document operating applications including, for example, Word, WPS, PhotoShop, Adobe, and the like applications. Hence, a driver needs to be installed in the peripheral device to directly transmit the documents opened by the applications in the terminal device to the peripheral device.

Since the terminal device needs to be connected to the peripheral device, but a user may not know the specific connecting operation between the terminal device and the peripheral device, it may be inconvenient for the user to connect the peripheral device with the terminal device or it may cause an incorrect connection between the peripheral device and the terminal device, which may lead to the user not being able to successfully install the driver in the terminal device.

SUMMARY

One aspect of the present disclosure provides a driver processing method on a terminal device side. The method includes: displaying a driver installation interface. The driver installation interface provides a connection method prompt message prompting a user to make a connection between a terminal device and a peripheral device.

Another aspect of the present disclosure provides a driver processing device on a terminal device side. The driver processing device includes a first display module configured for displaying a driver installation interface. The driver installation interface provides a connection method prompt message prompting a user to make a connection between a terminal device and a peripheral device.

Another aspect of the present disclosure provides a terminal device. The terminal device includes a memory, configured to store program instructions for performing a method for processing a driver; and a processor, coupled to the memory, and when the program instructions being executed, configured for displaying a driver installation interface. The driver installation interface provides a connection method prompt message prompting a user to make a connection between a terminal device and a peripheral device.

Another aspect of the present disclosure provides a non-transitory computer-readable storage medium, containing program instructions for, when executed by a processor, performing a method for processing a driver on a terminal device side, the method including displaying a driver installation interface. The driver installation interface provides a connection method prompt message prompting a user to make a connection between a terminal device and a peripheral device.

Another aspect of the present disclosure provides a peripheral device, connected to the terminal device. After the terminal device completes an installation of the driver according to the disclosed methods, the peripheral device communicates with the terminal device.

Other aspects or embodiments of the present disclosure can be understood by those skilled in the art in light of the description, the claims, and the drawings of the present disclosure.

BRIEF DESCRIPTION OF THE DRAWINGS

FIG. 1 is a schematic flowchart of a method for processing a driver on a terminal device side according to an embodiment of the present disclosure;

FIG. 2 is a schematic flowchart of another method for processing a driver on a terminal device side according to an embodiment of the present disclosure;

DETAILED DESCRIPTION OF THE EMBODIMENTS

Figure 3:
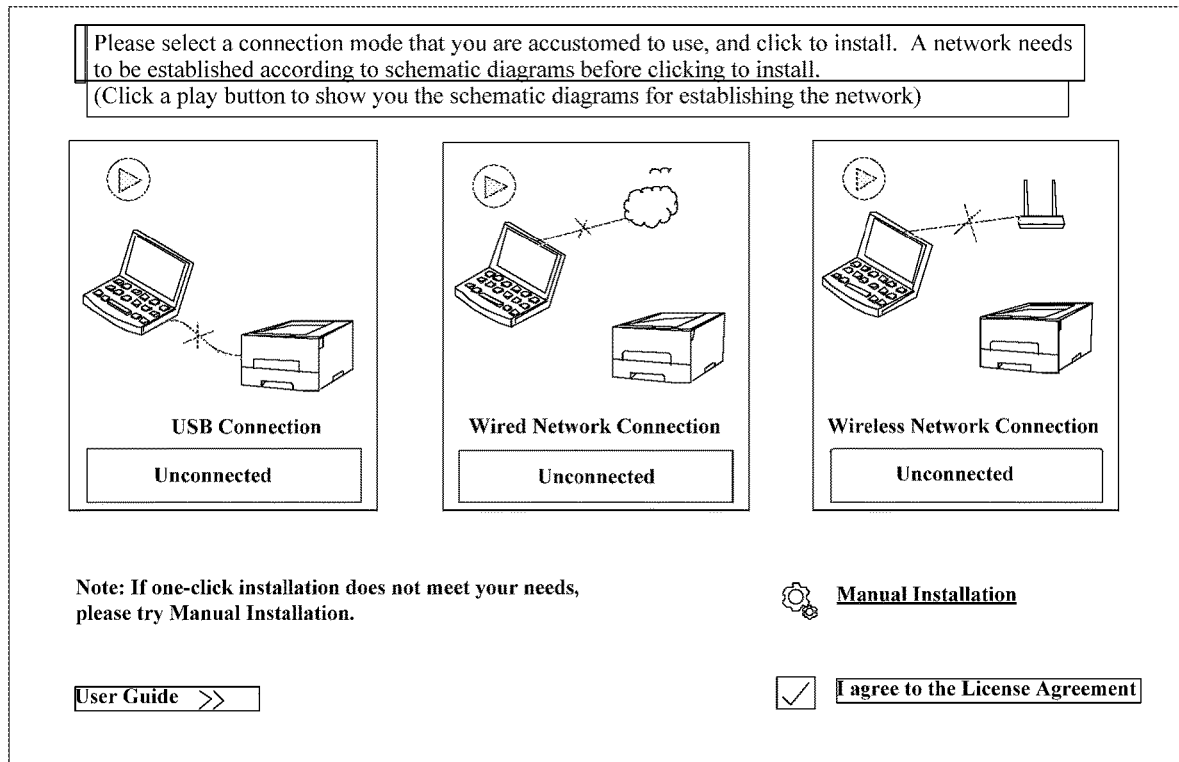
FIG. 3 is a display diagram illustrating a plurality of driver installation options according to various embodiments of the present disclosure.

To make the objectives, technical solutions, and advantages of the embodiments of the present disclosure more comprehensible, the following clearly and describes the technical solutions in the embodiments of the present disclosure with reference to the accompanying drawings in the embodiments of the present disclosure. Apparently, the embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

The present disclosure provides method, device, and storage medium for processing a driver on a terminal device side to solve problems which may be due to inconvenience for a user to connect the peripheral device with the terminal device or may cause an incorrect connection between the peripheral device and the terminal device, which further lead to the user being unable to successfully install the driver in the terminal device.

An exemplary driver processing method may include displaying a driver installation interface, where the driver installation interface provides a connection method prompt message prompting a user to connect the terminal device to a peripheral device. Therefore, the user may know the connection operation method such as the connection operation sequence, the connection process, and the like between the terminal device and the peripheral device, so it may be convenient for the user to connect the peripheral device with the terminal device to avoid the connection error between the peripheral device and the terminal device. Further, the user may successfully install the driver in the terminal device.

FIG. 1 is a schematic flowchart of a method for processing a driver on a terminal device side according to an embodiment of the present disclosure. As shown in FIG. 1, the method includes:

Step 101, displaying a driver installation interface, where the driver installation interface may provide a connection method prompt message prompting a user to connect the terminal device with a peripheral device.

For example, the execution main body of the present embodiment may be a terminal device, and the terminal device may be a device such as a computer or the like.

Before the terminal device is connected to the peripheral device, a driver installation interface may be displayed on the terminal device. A connection method prompt message may be displayed on the driver installation interface, and the connection method prompt message may be a message prompting the user to connect the terminal device with the peripheral device. In particular, the peripheral devices may be an image forming device. From the principle of image forming, the image forming device may be, but is not limited to, a laser printer, an inkjet printer, or a Light Emitting Diode (LED) printer. Functionally, the image forming device may be, but is not limited to, a single function printer, a copy machine, or a multifunction printer, where the multifunction may include one or more of scanning, faxing, binding, and the like The connection method prompt message may indicate the connection operation method such as the connection sequence and the connection process between the terminal and the peripheral device.

In one embodiment, terminal device may display the connection method prompt message based on any one or more of the following methods on the driver installation interface: a video method, an image method, and a text method.

For example, the terminal may display the operation information by using one or more of the video method, the image method, the text method, and the like.

For example, the connection method prompt message may be that the terminal device needs to be connected to the image forming device first, then the terminal device may access a network. Or, in another example, the connection method prompt message may be that the terminal device may access the network first, then the terminal device may be connected to the image forming device.

In the present embodiment, the driver installation interface may be displayed, where the driver installation interface may provide the connection method prompt message prompting the user to connect the terminal device with a peripheral device. Therefore, the user may know the connection operation method such as the connection operation sequence, the connection process, and the like between the terminal device and the peripheral device, so the user may connect the peripheral device with the terminal device to avoid the connection error between the peripheral device and the terminal.

FIG. 2 is a schematic flowchart of another method for processing a driver on a terminal device side according to an embodiment of the present disclosure. As shown in FIG. 2, the method includes:

Step 201, displaying a driver installation interface, where the driver installation interface may provide a connection method prompt message prompting a user to connect a terminal device with a peripheral device.

In particular, at least one installation option may be provided on the driver installation interface, and the connection method prompt message may be used to indicate how to make the connection between the terminal device and the peripheral device for each installation option of the at least one installation option In one embodiment, different connection method prompt messages may correspond to different installation options, and the different installation options may correspondingly require different connections between the terminal device and the peripheral device, such that the different connection method prompt messages may, based on the different installation options, display that connection methods between the terminal device and the peripheral device may also be different.

In one embodiment, the connection method prompt message may include any one or more of following messages: a video message, an image message, and a text message In one embodiment, when the connection method prompt message is a video message, the interface corresponding to the connection method prompt message may also provide a play button for prompting the user to view.

For example, at least one installation option may be provided on the driver installation interface displayed by the terminal device, and the user may select the installation option on the driver installation interface.

The connection method prompt message may indicate how to make the connection between the terminal device and the peripheral device for each installation option. For example, a display option may be provided, and the display option may correspond to the connection method prompt messages corresponding to all the installation options, such that the user may click on the display option to view all the connection method prompt messages. Alternatively, each connection method prompt message may correspond to each installation option. Different installation options may correspondingly require different connections between the terminal device and the peripheral device, such that the different connection method prompt messages may, based on the corresponding installation options, display that connection methods between the terminal device and the peripheral device may also be different. For example, in the case of a video message, the connection method prompt message corresponding to all the installation options may be played through one video, or it may be configured that one video may correspond to each installation option, and each video may respectively prompt the corresponding installation option on how to connect the terminal device to the peripheral device first.

In the present embodiment, when the connection method prompt message is a video message and each of the at least one installation option respectively corresponds to one video message, the displayed main page message corresponding to each of the video screens may be port connection state information corresponding to the current installation option. As such, if the corresponding installation option is not available, the user may intuitively know the reason (e.g., the corresponding port of the terminal device may not be connected according to a predetermined requirement or the corresponding port of the terminal device may not be detected by the peripheral device or the like) why the current driver installation option may not be available.

For example, the terminal device may generate the installation options corresponding to the supported connection types with the peripheral device and it may include:

Step 1, acquiring connection information between the peripheral device corresponding to the driver and the terminal device.

For example, the execution main body of the present embodiment may be a terminal device, and the terminal device may be a device such as a computer or the like. The driver of the present embodiment may be first stored in the terminal device in the form of an installation package. Once the driver is successfully installed, it may be used to convert the operational data provided by the application into data and instructions that may be recognized by the peripheral device. The driver installation package provided in the present embodiment may generally correspond to various types of peripheral devices developed by a certain manufacturer. For example, a model named P3500 may only support a device with an USB port; a model named P3500N may support a device with an USB port and a wired network port; a model name P3500NW may support a device with an USB port, a wired network port, and a wireless network port.

In one implementation method provided by the present disclosure, assuming the terminal device supports the USB port, the wired network port, the wireless network port, and all ports supported by the model of the peripheral device corresponding to the driver at the same time, after clicking the driver installation package in the terminal device, the driver installation interface may be entered. Further, the driver may detect whether each port of the current terminal device may be connected to the peripheral device. When the connection with the peripheral device is obtained, model information of the peripheral device may be further obtained to determine whether the peripheral device may be supported by the current driver and the type of drive installation method supported by the peripheral device. Of course, the present embodiment is not limited to the above assumption. When the terminal device cannot support all the above ports at the same time or some ports (e.g., the wired network port or the wireless network port) may not be connected according to the specific requirements, the implementation method may be as provided below: displaying that the terminal device may not support the corresponding operation; when the port of the terminal device is supported and if the peripheral device is still not acquired, displaying that the peripheral device may not be connected to the corresponding port. As such, the user may know in time whether the port connection of the terminal device may not meet the requirements, or whether the peripheral device may not be connected as required or may not support the driver installation option corresponding to the corresponding port.

The connection information may be acquired by detecting port information between the terminal device and the peripheral device; or the connection information may be a connection state between the terminal device and the peripheral device.

Step 2, determining the driver installation options that may successfully install the driver based on the connection information.

For example, in step 101, the terminal device may acquire whether at least one port of the terminal device has a peripheral device connection, and in the state where the peripheral device is connected, the connection type supported by the peripheral device may also be acquired. In one embodiment, the terminal device may determine, based on the acquired connection information, an allowed connection type between the terminal device and the peripheral device, and a disallowed connection type between the terminal device and the peripheral device. The connection type may be a USB connection type, a wired network connection type, a wireless network connection type, or the like. In particular, the wireless connection type may include a wireless-fidelity (Wi-Fi) network connection type, a Bluetooth connection type, and the like. Subsequently, the driver installation option that may and may not allow the terminal device to successfully install the driver may be determined.

In the present embodiment, the connection method prompt message may be a video message, an image message, a text message, etc.

Step 202, receiving a triggering instruction sent by the user.

For example, the terminal device may detect whether the terminal device and the peripheral device may be correctly connected. When the terminal device determines that the terminal device and the peripheral device may be correctly connected, a prompt message may be displayed, thereby facilitating the user to select a driver installation option. The user may send the triggering instruction to the terminal device by touching the terminal device or through a voice input. In addition, the triggering instruction may indicate the connection method prompt message selected by the user.

Step 203, displaying the connection method prompt message indicated by the triggering instruction based on the triggering instruction.

For example, the terminal device may display the connection method prompt message indicated by the triggering instruction based on the triggering instruction sent by the user.

When the terminal device displays the connection method prompt message indicated by the triggering instruction, the following two methods may be used.

Method 1, the terminal device may directly display the connection method prompt message.

Method 2, the terminal device may also display all the installation options graphically first, then the terminal device may display the connection method prompt message indicated by the triggering instruction. FIG. 3 is a display diagram illustrating a plurality of driver installation options according to various embodiments of the present disclosure. As shown in FIG. 3, the terminal device may graphically display the driver installation options and the user may know that the terminal device may support a USB connection, a wired network connection, and a wireless network connection with the peripheral device. Alternatively, the terminal device may display the connection types with the peripheral device supported by the terminal device, and the connection types with the peripheral device not supported by the terminal device, and the terminal may indicate the connection types with different colors. For example, the terminal device may display the connection type with the peripheral device not supported by the terminal device in gray.

It should be noted that, as shown in FIG. 3, in the implementation method provided in the present embodiment, after the driver installation package file is clicked on, the license agreement may be checked by default, and the driver installation package file may be executed according to the foregoing implementation method. However, the present embodiment is not limited thereto, and the default license agreement may not be checked, and the execution of "determining the driver installation options for successfully installing the driver" or "displaying the driver installation options for successfully installing the driver" mentioned in the above embodiment may be allowed after the user checks the license agreement. In addition, the implementation method provided in the present embodiment may also be configured that connection method prompt message may be displayed after the user checks the license agreement.

For example, when the terminal device determines that the USB connection is available, it may display a click-to-install, and when the wired network connection and the wireless network connection are not available, then "unconnected" may be displayed.

For example, the terminal device may not display the driver installation options that may not currently be successfully installed, for example, an option of an image forming device not supported by the hardware or a hardware-supported image forming device but is not actually connected. The terminal device may also display the driver installation option that may be successfully installed in a first state (e.g., highlight); and display the driver installation option that may not be successfully installed in a second state (e.g., grayed out).

For example, the terminal device may display an option of the user to select a model, and the driver may determine which types of installation the current terminal device supports, the terminal device may only display the installation types supported by the hardware of the image forming device of the current model, then based on the connection state between the terminal device and the image forming device, "click-to-install" may appear for the port which has been connected to the corresponding installation option and "unconnected" may be displayed for the port which has not been connected to the corresponding installation option.

For example, P3500NW may support USB, wired network, and wireless network. Therefore, based on the displayed methods of FIG. 3, three installation options may need to be displayed. If P3500NW only supports USB and wired network, the only USB and wired network may be displayed. If P3500NW only supports USB and wireless network, the only USB and wireless network may be displayed.

Subsequently, when the terminal displays the driver installation options, the user may select the corresponding video play button on top of any one of the driver installation options, and then the terminal may display the connection method prompt message corresponding to the driver installation option.

It should be noted that the playing method of the video provided in the present embodiment may be directly played on the driver installation interface, but is not limited thereto, and it may be played or displayed by using a pop-up window method.

In one embodiment, the connection method prompt message may be a video message. When the play button is clicked on, the video display interface may be displayed by using a pop-up window. Further, during the play of the video display interface, the interface where the driver installation option is located may be faded. In particular, the fade may refer to lightening, darkening, or blurring of the color of the interface, such that the display effect of the video display interface may be highlighted. Further, the size of the video display interface corresponding to the pop-up window may be configured to be larger than the corresponding interface size of the current installation option and the connection method prompt message. As such, the user may be prevented from making a mistake by installing the driver without following the displayed video message.

Figure 4:
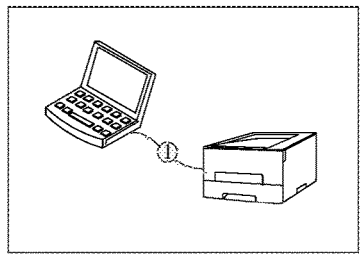
FIG. 4 is an exemplary display diagram illustrating a connection method prompt message according to various embodiments of the present disclosure.

For example, FIG. 4 is an exemplary display diagram illustrating a connection method prompt message according to various embodiments of the present disclosure. The user may click the play button above the USB connection type in FIG. 3, the terminal may display the image of FIG. 4, and the user may know that the image forming device and the terminal need to be connected first by a USB cable. In particular, reference numeral 1 in FIG. 4 indicates the connection sequence.

Figure 5:
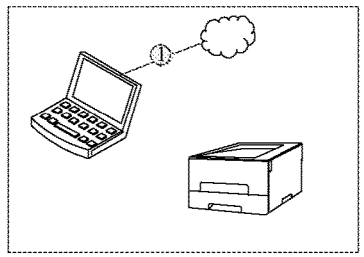
FIG. 5 is another exemplary display diagram illustrating a connection method prompt message according to various embodiments of the present disclosure.
Figure 6:
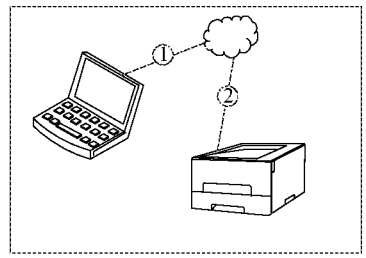
FIG. 6 is another exemplary display diagram illustrating a connection method prompt message according to various embodiments of the present disclosure.

For example, FIG. 5 is another exemplary display diagram illustrating a connection method prompt message according to various embodiments of the present disclosure and FIG. 6 is another exemplary display diagram illustrating a connection method prompt message according to various embodiments of the present disclosure. The user may click the play button above the wired network connection in FIG. 3 and the terminal device may display the images of FIG. 5 and FIG. 6. Further, the user may know that the terminal device may need to be connected to the wired network first, and then the image forming device may be connected to the wired network. In particular, reference numeral 1 in FIG. 5 indicates the connection sequence, and reference numerals 1 and 2 in FIG. 6 indicate the connection sequence.

For example, the terminal device may also detect the state of the terminal device. If the state of the terminal device is connected to the wired network, then FIG. 3 above may only display that the image forming device is not connected to the wired network, and the prompted animation may only need to remind the user to connect the image forming device to the wired network.

Figure 7:
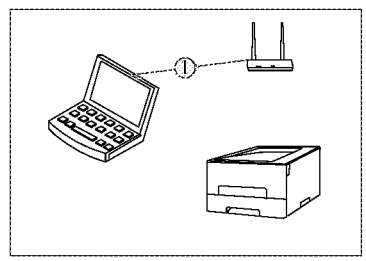
FIG. 7 is another exemplary display diagram illustrating a connection method prompt message according to various embodiments of the present disclosure.
Figure 8:
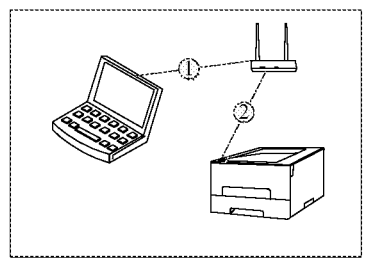
FIG. 8 is another exemplary display diagram illustrating a connection method prompt message according to various embodiments of the present disclosure.

For example, FIG. 7 is another exemplary display diagram illustrating a connection method prompt message according to various embodiments of the present disclosure and FIG. 8 is another exemplary display diagram illustrating a connection method prompt message according to various embodiments of the present disclosure. The user may click the play button above the wireless network connection type in FIG. 3 and the terminal may display the images of FIG.

7 and FIG. 8. Further, the user may know that the terminal may need to be connected to the wireless network first, and then the image forming device may be connected to the wireless network. In particular, reference numeral 1 in FIG. 7 indicates the connection sequence, and reference numerals 1 and 2 in FIG. 8 indicate the connection sequence.

Figure 9:
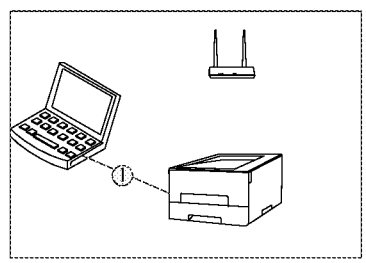
FIG. 9 is another exemplary display diagram illustrating a connection method prompt message according to various embodiments of the present disclosure.
Figure 10:
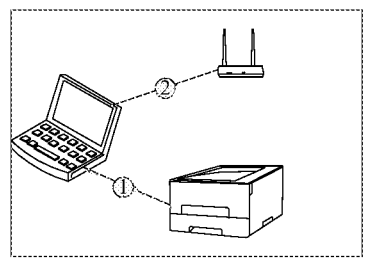
FIG. 10 is another exemplary display diagram illustrating a connection method prompt message according to various embodiments of the present disclosure.

For example, FIG. 9 is another exemplary display diagram illustrating a connection method prompt message according to various embodiments of the present disclosure and FIG. 10 is another exemplary display diagram illustrating a connection method prompt message according to various embodiments of the present disclosure. The user may click the play button above the wireless network connection type in FIG. 3 and the terminal may display the images of FIG. 9 and FIG. 10. Further, the user may know that the image forming device and the terminal may need to be connected through the USB cable first, and then the terminal may be connected to a Wireless-Fidelity (which may be referred to as Wi-Fi) network. In particular, reference numeral 1 in FIG. 9 indicates the connection sequence, and reference numerals 1 and 2 in FIG. 10 indicate the connection sequence.

Figure 11:
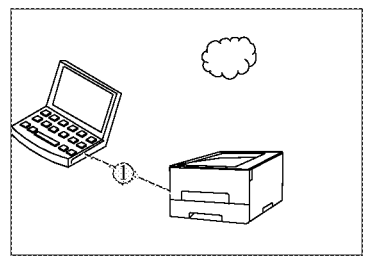
FIG. 11 is another exemplary display diagram illustrating a connection method prompt message according to various embodiments of the present disclosure.
Figure 12:
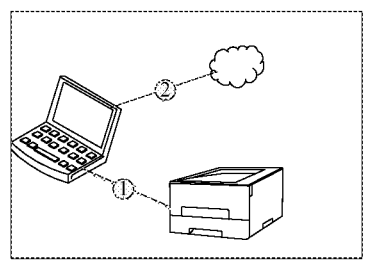
FIG. 12 is another exemplary display diagram illustrating a connection method prompt message according to various embodiments of the present disclosure.

For example, FIG. 11 is another exemplary display diagram illustrating a connection method prompt message according to various embodiments of the present disclosure and FIG. 12 is another exemplary display diagram illustrating a connection method prompt message according to various embodiments of the present disclosure. The user may click the play button above the wireless network connection type in FIG. 3 and the terminal may display the images of FIG. 11 and FIG. 12. Further, the user may know that the image forming device and the terminal may need to be connection through the USB cable first, and then the terminal may be connected to the wireless network. At this point, the user may need to manually input a Service Set Identifier (SSID) and password of the Wi-Fi network for installation. Therefore, it means that during the driver installation process, the terminal may automatically transmit the stored SSID and password of the Wi-Fi network to the image forming device, so a Wi-Fi module of the image forming device may automatically connect to the wireless network based on the SSID and the password. In particular, reference numeral 1 in FIG. 11 indicates the connection sequence, and reference numerals 1 and 2 in FIG. 12 indicate the connection sequence.

The above figures may vary in connection with the actual state of the current computer. For example, when the terminal is connected to a wired network or a wireless network, the corresponding image forming device may be displayed in an unconnected (wired or wireless) state on the screen corresponding to FIG. 3 above, and the prompted animation may skip the step of prompting the user to connect the computer to the network (wired or wireless).

Step 204, detecting connection state information between the terminal device and the peripheral device and determining a specific content of the connection method prompt message based on the connection state information.

For example, after step 203, the terminal device may detect the connection state between the terminal device and the peripheral device. The terminal device may further determine the specific content corresponding to the connection method prompt message based on the connection state information. Subsequently, the terminal device may still display the specific content by using any one or more of the following methods: video, image, and text.

The terminal device may display the acquired connection state between the terminal and the peripheral device. For example, the terminal may prompt an animation interface above the installation options of FIG. 3, and the animation interface may display the connection state of the image forming device and the terminal device.

In the present embodiment, by displaying the driver installation interface, where the driver installation interface may provide the connection method prompt message prompting the user to connect the terminal device to the peripheral device; and displaying the connection method prompt message indicated by the triggering instruction based on the triggering instruction sent by the user, the user may view the connection method prompt message. Therefore, the user may know the connection operation method such as the connection operation sequence, the connection process, and the like between the terminal device and the peripheral device, so it may be convenient for the user to connect the peripheral device with the terminal device to avoid the connection error between the peripheral device and the terminal device. Further, the user may successfully install the driver in the terminal device.

Figure 13:
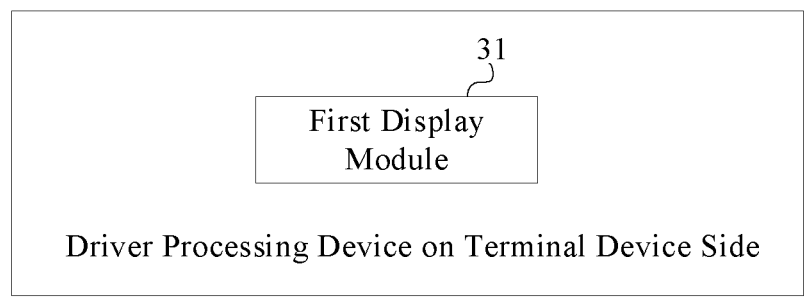
FIG. 13 is a schematic structural diagram of a processing device of a driver on a terminal device side according to an embodiment of the present disclosure.

FIG. 13 is a schematic structural diagram of a driver processing device of a driver on a terminal device side according to an embodiment of the present disclosure. As shown in FIG. 13, the device may include:

A first display module 31, which may be used to display the driver installation interface, where the driver installation interface may provide the connection method prompt message prompting the user to connect the terminal device with the peripheral device.

The processing device of the driver on the terminal device side of the present embodiment may perform the processing method of the driver on the terminal device side of the embodiments in the present disclosure, the implementation principle thereof is similar, and details are not described herein again.

In the present embodiment, by displaying the driver installation interface, where the driver installation interface may provide the connection method prompt message prompting the user to connect the terminal device to the peripheral device, the user may know the connection operation method such as the connection operation sequence, the connection process, and the like between the terminal device and the peripheral device, so it may be convenient for the user to connect the peripheral device with the terminal device to avoid the connection error between the peripheral device and the terminal device. Further, the user may successfully install the driver in the terminal device.

Figure 14:
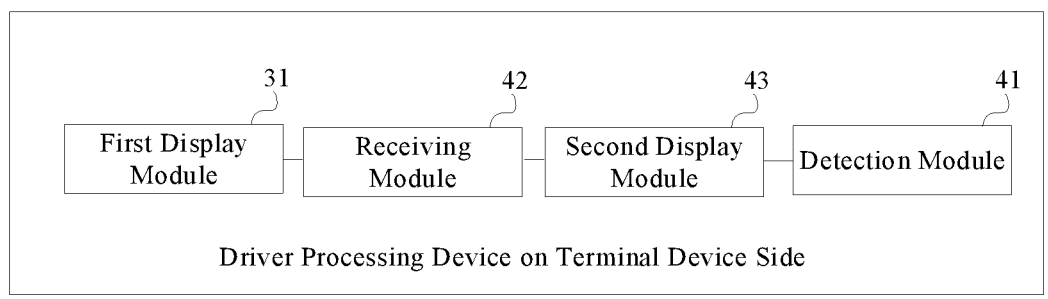
FIG. 14 is a schematic structural diagram of another device for processing a driver on a terminal device side according to an embodiment of the present disclosure.

FIG. 14 is a schematic structural diagram of another device for processing a driver on a terminal device side according to an embodiment of the present disclosure. As shown in FIG. 14, on the basis of the embodiment shown in FIG. 13, in the device of the present embodiment, at least one installation option may be provided on the driver installation interface, and the connection method prompt message may be used to indicate how to make the connection between the terminal device and the peripheral device for each installation option of the at least one installation option Different connection method prompt messages may correspond to different installation options, and the different installation options may correspondingly require different connections between the terminal device and the peripheral device, such that the different connection method prompt messages may, based on the different installation options, display that connection methods between the terminal device and the peripheral device may also be different.

In one embodiment, the connection method prompt message may include any one or more of following messages: a video message, an image message, and a text message When the connection method prompt message is a video message, the interface corresponding to the connection method prompt message may also provide a play button for prompting the user to view.

The device of the present embodiment may further include:

A detection module 41, which may be used to detect the connection state information between the terminal device and the peripheral device, and determine the specific content of the connection method prompt message based on the connection state information.

The device of the present embodiment may further include:

A receiving module 42, which may be used to receive the triggering instruction sent by the user after the first display module 31 displays the driver installation interface.

A second display module 43, which may be used to display the connection method prompt message indicated by the triggering instruction based on the triggering instruction.

The processing device of the driver on the terminal device side of the present embodiment may perform the processing method of the driver on the terminal device side of another embodiment in the present disclosure, the implementation principle thereof is similar, and details are not described herein again.

In the present embodiment, by displaying the driver installation interface, where the driver installation interface may provide the connection method prompt message prompting the user to connect the terminal device to the peripheral device; and displaying the connection method prompt message indicated by the triggering instruction based on the triggering instruction sent by the user, the user may view the connection method prompt message. Therefore, the user may know the connection operation method such as the connection operation sequence, the connection process, and the like between the terminal device and the peripheral device, so it may be convenient for the user to connect the peripheral device with the terminal device to avoid the connection error between the peripheral device and the terminal device. Further, the user may successfully install the driver in the terminal device.

Figure 15:
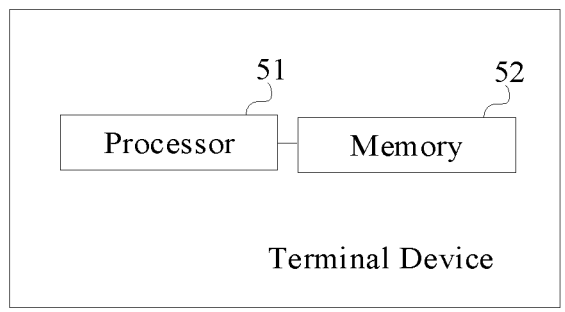
FIG. 15 is a schematic structural diagram of a terminal device according to an embodiment of the present disclosure.

FIG. 15 is a schematic structural diagram of a terminal device according to an embodiment of the present disclosure. As shown in FIG. 15, the terminal device of the present embodiment may include:

A processor 51 and a memory 52.

The processor 51 may be connection with the memory 52, where the memory 52 may be used to store computer executable codes, and the codes may include instructions. When the processor 51 executes the instructions, the instructions may cause the terminal device to perform the methods provided in the embodiments of FIG. 1 and FIG. 2.

An embodiment of the present disclosure further provides a computer storage medium, and the computer storage medium may store computer executable instructions to perform any of the methods mentioned above, such that the processor may execute the instructions to implement the method and function of the terminal device in the method embodiments mentioned above.

An embodiment of the present disclosure further provides a peripheral device and the peripheral device may be connected to the terminal device, which may include: after the terminal device completes the driver installation based on the methods shown in the embodiments of FIG. 1 and FIG. 2, communicate with the terminal device.

The technical effect of the present disclosure includes: displaying the driver installation interface, where the driver installation interface provides a connection method prompt message prompting a user to connect a terminal device to a peripheral device. Therefore, the user may know the connection operation method such as the connection operation sequence, the connection process, and the like between the terminal device and the peripheral device, so it may be convenient for the user to connect the peripheral device with the terminal device to avoid the connection error between the peripheral device and the terminal device. Further, the user may successfully install the driver in the terminal device.

Those skilled in the art should know that: all or part of the steps of the method embodiment may be implemented by related hardware instructed through a program, the program may be stored in a computer-readable storage medium, and the program is executed to execute the steps of the method embodiment; and the storage medium includes: a ROM, a RAM, a magnetic disk or a compact disc.

Although the disclosure is described through some exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the following claims or their equivalents.

What is claimed is:

1. A driver processing method on a terminal device side, comprising:
   displaying a driver installation interface, wherein:
   the driver installation interface provides a connection method prompt message prompting a user to make a connection between a terminal device and a peripheral device,
   at least one installation option is provided on the driver installation interface, each of the at least one installation option respectively corresponding to a video message of the connection method prompt message, and
   a displayed main page message corresponding to each video message is port connection state information corresponding to a current installation option.

2. The method of claim 1, wherein the connection method prompt message is used to indicate how to make the connection between the terminal device and the peripheral device for each installation option of the at least one installation option.

3. The method of claim 2, wherein different connection method prompt messages correspond to different installation options, and the different installation options correspondingly require different connections between the terminal device and the peripheral device, such that the different connection method prompt messages, based on the different installation options, display that connection methods between the terminal device and the peripheral device are also different.

4. The method of claim 2, wherein the connection method prompt message further includes any one or more of following messages: an image message, and a text message.

5. The method of claim 1, wherein when the connection method prompt message is the video message, and an interface corresponding to the connection method prompt message is further configured with a play button for prompting the user to view the video message.

6. The method of claim 1, wherein the connection method prompt message is the video message; after a play button is clicked, a video display interface is displayed by using a pop-up window, and during a play of the video display interface, an interface where the driver installation option is located is faded.

7. The method of claim 1, further comprising:
detecting connection state information between the terminal device and the peripheral device, and
determining a specific content of the connection method prompt message based on the connection state information.

8. The method of claim 1, wherein after displaying the driver installation interface, further comprising:
receiving a triggering instruction sent by the user, and
based on the triggering instruction, displaying the connection method prompt message indicated by the triggering instruction.

9. A terminal device, comprising:
a memory, configured to store program instructions for performing a method for processing a driver; and
a processor, coupled to the memory, and when the program instructions being executed, configured for:
displaying a driver installation interface, wherein:
the driver installation interface provides a connection method prompt message prompting a user to make a connection between a terminal device and a peripheral device,
at least one installation option is provided on the driver installation interface, each of the at least one installation option respectively corresponding to a video message of the connection method prompt message, and
a main page messaged displayed on a video screen corresponding to each video message is port connection state information corresponding to a current installation option.

10. The device of claim 9, wherein the connection method prompt message is used to indicate how to make the connection between the terminal device and the peripheral device for each installation option of the at least one installation option.

11. The device of claim 10, wherein different connection method prompt messages correspond to different installation options, and the different installation options correspondingly require different connections between the terminal device and the peripheral device, such that the different connection method prompt messages, based on the different installation options, display that connection methods between the terminal device and the peripheral device are also different.

12. The device of claim 10, wherein the connection method prompt message further includes any one or more of following messages: an image message, and a text message.

13. The device of claim 10, wherein the connection method prompt message is the video message; after a play button is clicked, a video display interface is displayed by using a pop-up window, and during a play of the video display interface, an interface where the driver installation option is located is faded.

14. The device of claim 9, wherein when the connection method prompt message is the video message, and an interface corresponding to the connection method prompt message is further configured with a play button for prompting the user to view the video message.

15. The device of claim 9, wherein the processor is further configured for:
detecting connection state information between the terminal device and the peripheral device and determining a specific content of the connection method prompt message based on the connection state information.

16. The device of claim 9, wherein the processor is further configured for:
receiving a triggering instruction sent by the user after the driver installation interface is displayed, and
displaying the connection method prompt message indicated by the triggering instruction based on the triggering instruction.

17. The device according to claim 9, wherein:
after the terminal device completes an installation of the driver, the terminal device is communicated with the peripheral device.

18. A non-transitory computer-readable storage medium, containing program instructions for, when executed by a processor, performing a method for processing a driver on a terminal device side, the method comprising:
displaying a driver installation interface, wherein:
the driver installation interface provides a connection method prompt message prompting a user to make a connection between a terminal device and a peripheral device,
at least one installation option is provided on the driver installation interface, each of the at least one installation option respectively corresponding to a video message of the connection method prompt message, and
a main page messaged displayed on a video screen corresponding to each video message is port connection state information corresponding to a current installation option.

* * * * *